Aug. 1, 1933.  L. V. LUCIA  1,920,871
HEATING DEVICE
Filed Dec. 2, 1927  2 Sheets-Sheet 1
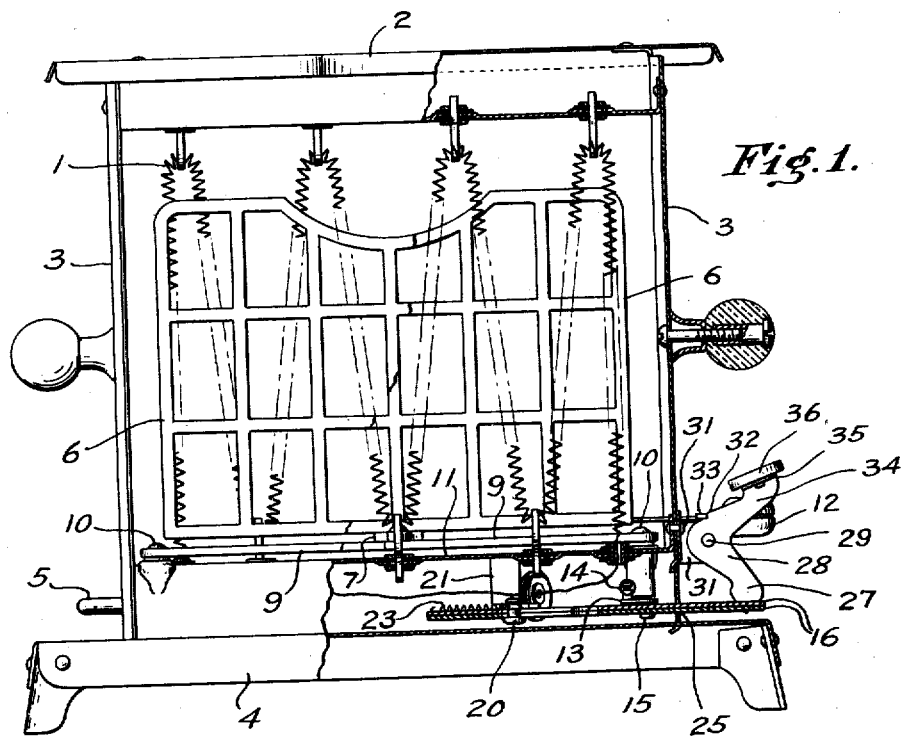
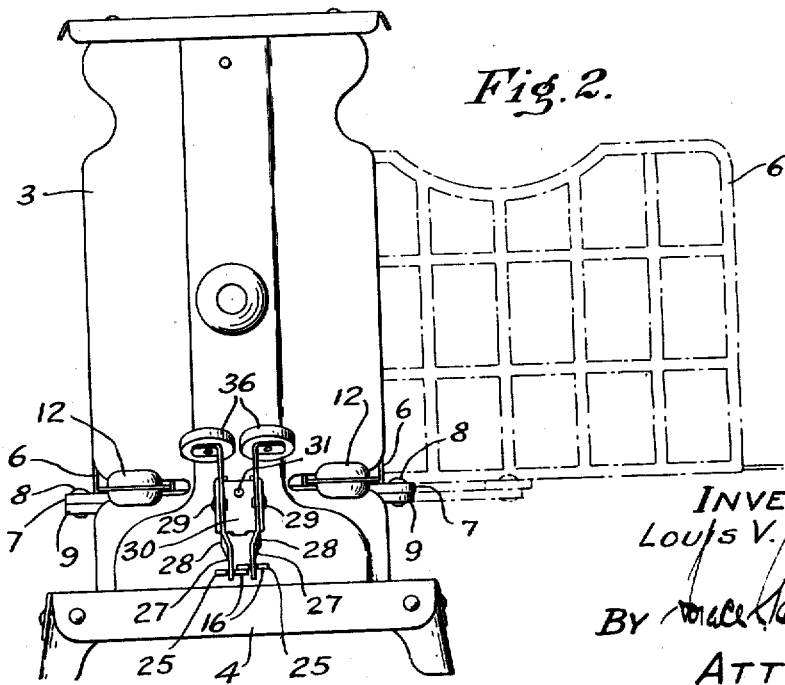

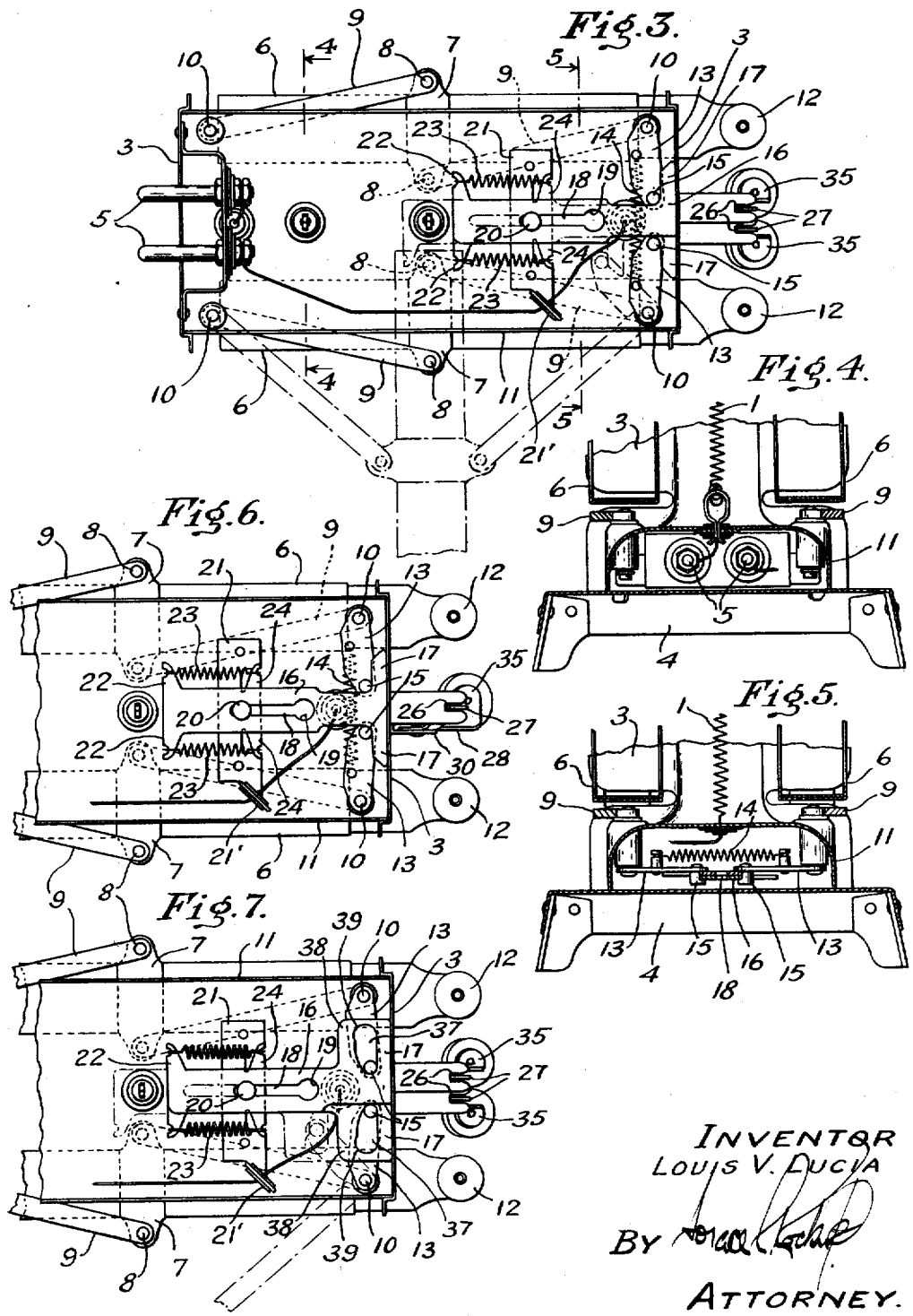

Patented Aug. 1, 1933

1,920,871

UNITED STATES PATENT OFFICE 1,920,871

HEATING DEVICE

Louis V. Lucia, Hartford, Conn., assignor, by mesne assignments, to The Beardsley & Wolcott Mfg. Co., a Corporation of Connecticut Application December 2, 1927. Serial No. 237,310

56 Claims. (Cl. 53—5)

My invention relates to heating devices.

It has for its object to provide an improved heating device, and more particularly to provide improved means whereby the rack or racks of a toaster or the like may be adjusted in an improved manner. A further object of my invention is to provide improved means whereby such a rack or racks may be moved to filling position, reversed relative to the heater, and moved to emptying position, all with greater facility, convenience and expedition than heretofore and without danger of burning the operator. Another object is to provide improved means whereby the plurality of toast racks ordinarily provided on a toaster may be adjusted singly or simultaneously as above set forth. These and other objects and advantages of my improved construction will, however, hereinafter more fully appear.

In the accompanying drawings I have shown for purposes of illustration three embodiments which my invention may assume in practice.

In these drawings,—

Figure 1 is a side elevation, partially in section to facilitate illustration, of a toaster equipped with one form of my improvement utilizing a plurality of actuating members;

Fig. 2 is an end view of the same showing one of the racks dotted in transverse position;

Fig. 3 is a bottom plan view, also showing one of the racks transversely disposed and certain of the parts connected thereto in full and dotted line position;

Fig. 4 is a sectional view on line 4—4 of Fig. 3;

Fig. 5 is a sectional view on line 5—5 of Fig. 3;

Fig. 6 is a bottom plan view of a modified construction utilizing a single actuating member, and Fig. 7 is a similar view showing a modified form of the type shown in Figs. 1 to 5, embodying improved rack positioning means.

Considering first the illustrative construction shown in Figs. 1 to 5, it will be noted that I have shown therein a toaster of the electric type embodying an electric heating element 1 of any suitable form, herein carried as usual in a frame 2 comprising the usual end walls 3 and mounted on a base 4, the conductor 1 herein being supplied, as usual, with electric current through terminal plugs 5 suitably connected thereto, and the frame also herein carrying on each side thereof toast racks 6 adjustable relative to the toaster frame 2 and heating element 1 in an improved manner hereinafter described.

Considering the construction more specifically, it will be noted that the racks 6 are mounted on the frame 2 in the general manner described and claimed in the Frank E. Wolcott Patent No. 1,617,559, dated Feb. 15, 1927. More particularly, each is provided intermediate its ends with a transverse bottom plate 7 pivotally connected at 8 to oppositely extending parallel links 9, which are in turn pivoted at 10 on an intermediate bottom member or base 11 on the frame 2 above the base 4 and at the opposite ends of each rack. Also, it will be noted that each rack is provided with a rigidly connected insulated handle member 12 so that the rack upon manual movement of this handle may be swung to any desired angular position relative to the frame 2, such, for example, as the right angle position shown in dotted lines in Fig. 3, or any lesser angle, to permit the insertion or removal of toast, or whenever desired completely reversed so that it presents the opposite side of the toast therein to the heater 1. Thus it is possible for each of the racks to be adjusted manually, either partially or completely, as may be desired in the use of the toaster in the same manner described and claimed in the above mentioned patent.

In my improved construction I have provided improved means supplementary to the means heretofore described, whereby the racks may be similarly adjusted while still enabling the device to be manually adjusted as heretofore described whenever desired. More particularly, it will be noted that at the same end of each rack and on two of the pivots 10 I have provided beneath the base 11 a swinging member 13 and so disposed these swinging members that they normally extend transversely and toward each other, as shown in Fig. 3, the same herein also being connected by a single transverse coiled spring 14 connected to each member 13 at a point between its ends and near the left hand edge thereof as shown in that figure. Further, it will be noted that herein improved operator actuated means are provided to actuate or swing each of these members 13, and consequently each of the racks 6, to effect the adjustments heretofore possible only when the operator manipulated the members 12.

Considering the illustrative mechanism more in detail, it will be noted that each of the members 13 carries on its free end a downwardly extending member 15, herein in the form of a pin. Further, each of these pins 15 is engaged by a reciprocating member 16 reciprocating in a horizontal plane below the top of the intermediate base 11 and above the base 4. Herein each member 16 has a laterally extending arm 17 having a front edge engageable with the pin 15 and adapted as the member 16 is reciprocated in one direction, to the left in Fig. 3, to swing the member 13 about its pivot 10. It will also be noted that these members 16 herein are superimposed and slidably mounted at each end. As shown, each is provided with a slot 18 intermediate its ends and having an enlarged end 19. Each member is also movable within the limits of this slot relative to a guiding and retaining pin 20 carried on a depending bracket 21. This bracket 21 is in turn carried on the bottom of the base 11 and herein also has a struck-up arm carrying a conductor guide 21' which deflects one of the heater connections around the bracket. Also, it will be noted that each of the members 16 is provided with a lateral extension 22 on its inner end connected by a coiled spring 23 to a corresponding lateral extension 24 formed on the bracket, and that the lateral extensions 22 and 24 cooperating with different members extend laterally in opposite directions. As shown, the opposite end of each member 16 is also supported on the frame, herein, as preferably, extending through an aperture 25 formed in the side 3 below the top of the intermediate base 11 and near the top of the base 4. Thus, when a member 16 is reciprocated manually, it is made possible for its rack 6 to be adjusted as desired relative to the heater independently of manual manipulation of the member 12, and all the parts are returned to their initial positions by the springs 14 and 23. It will, of course, also be evident that either member 16 may be operated independently or simultaneously with its fellow.

Herein I have also provided improved means for operating the members 16. More particularly, it will be noted that the outer end of each of the same is provided with a longitudinal slot 26 in which is disposed the lower end 27 of a bell crank member 28 pivoted at 29 on brackets 30 projecting longitudinally from the frame ends 3 and suitably attached thereto, as at 31. More particularly, it will be noted that each of the bell cranks 28 is provided with an abutment 32 above its pivot adapted to engage a lug 33 on the bracket 30 when its member 16 is projected by its spring 23. Also, each bell crank 28 is herein provided with a normally upstanding arm 34 carrying a push button and in this illustrative construction having a laterally offset operating extension thereon constituting a push button 35 and herein carrying an insulating cap 36. Thus it will be noted that an exceedingly convenient and simple means of reciprocating each member 16 is provided, it only being necessary for the operator to depress the desired push button or buttons to effect the independent or simultaneous adjustment of the racks to the extent desired.

In the use of this construction, it is only necessary for an operator desiring to insert or remove toast, to depress one or both of the push buttons 35 separately or simultaneously to the desired degree to cause the rack or racks 6 to assume the desired angular position relative to the toaster frame. In the angular positions caused by partial depression of the push button or buttons, the toast may be inserted. Then, upon simply releasing the push buttons 35, the springs 14 and 23 act automatically to return the rack or racks to their normal or toasting position and to re-set the push buttons. When it is later desired to reverse the rack so as to toast the other side of the bread, a second and longer depression of the push buttons 35 results in effecting this operation automatically, the pins 15 then being thrown to such an extent as to move the arms 9 to effect a complete reversing operation in cooperation with the springs which return the parts as above set forth.

In Fig. 6 I have illustrated a modified construction whereby both of the racks may be controlled by a single reciprocating member 16. In this construction it will be noted that the only structural differences are the provision of a single member 16 connected to and operated by a single push button 35 and provided with a plurality of arms 17, and further provided with a plurality of arms 22 and springs 23 cooperating with a plurality of extensions 24 on the bracket 21. While such a single push button construction is adapted to use under certain conditions and is obviously simpler than the construction shown in Figs. 1 to 5, it is not at present preferred on account of the greater flexibility in operation of the latter construction wherein it is possible to operate the two racks independently if desired.

In Fig. 7 I have illustrated a further modified construction, which is identical with that shown in Figs. 1 to 5 save for the fact that the arms 17 are formed by punching out apertures 37 in enlarged lateral projections 38 on the members 16, and that notches 39 are provided in these punched out portions opposite the ends of the arm portions 17, while the spring 14 is omitted and stronger springs 23 are used. These notches 39 are adapted upon operation of either push button to cooperate with the pin 15 in positioning the rack in the transverse dotted line position shown in Fig. 3. Such a construction is desirable because of this locating feature, but is not now preferred as compared with the construction of Figs. 1 to 5, since in the use of the latter construction by varying the pressure on the push buttons 35 it is found that the operator can adjust the rack into any desired position and, with one or more fingers holding the push button or buttons, use the other hand to insert or remove toast with facility in a variety of positions.

As a result of my improvement it is made possible to adjust the toastrack or racks very conveniently and expeditiously and with a minimum of effort. Further, it will be noted that due to the location of the push buttons the same are so disposed that there is no danger of burning the operator, the push buttons being out of the normal upward path of the heat. The location of the buttons is also very convenient, the same being at the opposite end from the plug and disposed so low as to enable the ready operation of the push buttons by a finger or fingers when the hand is supported on the table. Attention is also directed to the fact that all of the operating mechanism with the exception of the actuating members is concealed within the frame of the toaster so that an exceedingly attractive mechanism is provided. It will also be noted that the mechanism itself is of an exceedingly simple and rugged character adapted to withstand long use in service, and that the mechanism is so simple as to enable it to be produced very economically. It will also be evident that it is adapted to be readily and economically applied to toasters of the Wolcott type without substantial change therein.

While I have in this application specifically described three forms which my invention may assume in practice, it will be understood that the same are shown for purposes of illustration and that the invention may be further modified and embodied in various other forms without departing from its spirit or the scope of the appended claims.

What I claim as new and desire to secure by Letters Patent is:

1. In combination, a heater including a frame and a movable rack thereon, and means including a depressible actuating member engageable by an operator and operative by said member to reverse said rack relative to said heater.

2. In combination, a heater including a frame and a movable rack thereon, and means including a variably depressible actuating member engageable by an operator and actuatable by said member at will to move said rack into angular or reverse positions relative to said heater.

3. In combination, a toaster having a movable toast rack thereon, and means including an actuating push button engageable by an operator and actuatable by said button to move said rack into reverse position relative to said toaster.

4. In combination, a toaster having a reversible toast rack thereon, and rack reversing mechanism thereon including an actuating member engageable by an operator and mounted adjacent the bottom of the toaster for movement in an upright plane.

5. In combination, a heater including a frame and a plurality of racks, one on each side thereof, and mechanism for reversing said racks relative to said frame including push button means operative substantially in the longitudinal center line of said frame.

6. In combination, a heater including a frame and a plurality of racks, one on each side thereof and each adapted to be reversed relative thereto, and mechanism for reversing said racks including a plurality of actuating members movable in vertical planes and engageable by an operator.

7. In combination, a toaster having a reversible rack on each side thereof, and mechanism for singly or simultaneously reversing said racks including adjacent actuating members movable in upright planes and engageable by adjacent fingers.

8. In combination, a toaster having a reversible rack on each side thereof, rack reversing mechanism, and a plurality of adjacent depressible push buttons adjacent the base of the toaster and selectively operable to reverse different racks.

9. In combination, a heater including a frame and a movable rack thereon movable on a vertical axis, and means including a depressible actuating member engageable by an operator and movable by said member to adjust said rack relative to said heater.

10. In combination, a heater including a frame and a movable rack thereon movable on a vertical axis, and means for adjusting said rack carried on said frame and including a depressible lever engageable by an operator.

11. In combination, a heater including a frame and a rack, swinging means operative to swing the rack into reverse operative relation, an actuating member engageable by an operator, and actuating mechanism actuated thereby and actuating said swinging means.

12. In combination, a heater including a frame and a rack thereon adapted to swing into reversed operative relation thereto, and actuating means therefor including operative connections movable relative to the rack to actuate the latter and having an actuating member for said connections engageable by an operator and disposed on the end wall of said frame.

13. In combination, a heater carried on a frame and having a movable rack, and rack actuating mechanism adapted to swing the rack into reverse operative relation and including an actuating member engageable by an operator and mounted on the frame and moving in an upright plane.

14. In combination, a heater including a frame, a rack thereon, and mechanism for reversing said rack carried by said frame and having actuating means movable substantially in the longitudinal center line of the base of the latter and engageable by the operator at one end of said base.

15. In combination, a heater including a frame and a rack thereon, and means for reversing said rack relative to said frame including a push button operated member movable in a plane extending longitudinally of the frame and rack reversing connections actuated thereby.

16. In combination, a heater including a frame and a rack thereon adapted to swing in an upright position, and means for swinging said rack including a depressible actuating member engageable by an operator and movable in an upright plane and carried adjacent the base of said frame.

17. In combination, a heater including a movable rack and a bottom member, and means for adjusting said rack including swinging mechanism above said bottom member and actuating mechanism therefor below said bottom member and having a protruding actuating member likewise below said bottom member and reciprocable longitudinally of said heater.

18. In combination, a heater including a movable rack and a bottom member, and means for reversing said rack relative to said heater including reversing mechanism above said member and actuating mechanism therefor below said member and having an external actuating member.

19. In a toaster, a heater including a movable rack and having a plurality of base members, one above the other, and means for adjusting said rack including swinging mechanism above the upper base member and actuating mechanism therefor housed in said member and having an external actuating member.

20. In a toaster, a heater including a frame and a rack thereon adapted to swing into reverse operative relation thereto, and means for swinging said rack including a vertically swinging actuating member, a member actuated thereby and movable horizontally, and rack actuating connections actuated by said horizontally movable member.

21. In combination, a heater including a frame and a plurality of racks on opposite sides thereof each adapted to swing in an upright position, and mechanism for singly or simultaneously adjusting said racks including a plurality of actuating members movable relative thereto in upright planes to actuate the latter.

22. In combination, a heater including a frame and a plurality of racks on opposite sides thereof each adapted to swing in an upright position, and mechanism for singly or simultaneously adjusting said racks including a plurality of actuating members movable relative thereto to actuate the latter and having adjacent operating portions movable in parallel planes.

23. In combination, a heater including a frame and a plurality of racks on opposite sides thereof each adapted to swing in an upright position, and mechanism for singly or simultaneously adjusting said racks including adjacent vertically swinging actuating members actuatable by adjacent fingers.

24. In combination, a heater including a frame and a reversing mechanism and rack thereon, and reversing mechanism for said mechanism including a horizontally swinging member operative to reverse said first mentioned mechanism and push-button operated means for swinging said member.

25. In combination, a heater including a frame and a rack swinging mechanism and rack thereon, and swinging mechanism for said mechanism including a horizontally swinging member operative to swing said first mentioned mechanism and means for swinging said member including a reciprocable actuating member movable relative to said swinging member.

26. In combination, a heater including a frame and a swinging rack thereon movable into reversed position, and rack swinging mechanism including a swinging member and means for swinging said member including a single depressible actuating member engageable by an operator.

27. In combination, a heater including a frame and a swinging rack thereon movable into reversed position, and rack swinging mechanism including a swinging member and actuating means for said member including a reciprocable member.

28. In combination, a heater including a frame, a swinging frame including a rack and movable relative to said frame to swing the rack into reverse operative relation, and rack swinging mechanism including a swinging member operative to swing said swinging frame and actuating means for said member having a manually engageable member moving longitudinally of said frame substantially in the longitudinal center line thereof.

29. In combination, a heater including a frame and a swinging rack thereon, and rack swinging mechanism operative to swing the rack into reverse operative relation to the frame including a swinging member, a reciprocable actuating member therefor, and a pivoted actuating member for said reciprocable member.

30. In combination, a heater including a frame and a rack thereon, and rack swinging mechanism operative to swing the rack into reverse operative relation to the frame including arms operatively connected to said rack, a movable arm actuating member, and means for moving said arm actuating member movable relative thereto.

31. In combination, a heater including a frame and a rack thereon, and rack swinging mechanism operative to swing the rack into reverse operative relation to the frame including arms operatively connected to said rack, a movable arm actuating member, and means for moving said arm actuating member including a reciprocable member.

32. In combination, a heater including a frame and a rack thereon, and rack swinging mechanism operative to swing the rack into reverse operative relation to the frame including arms operatively connected to said rack, a movable arm actuating member, and means for moving said arm actuating member including a pivoted member.

33. In combination, a heater including a frame and a rack thereon, and rack swinging mechanism operative to swing the rack into reverse operative relation to the frame including arms operatively connected to said rack, a movable arm actuating member, a reciprocable actuating member for said movable member, a pivoted member actuating said reciprocable member, and spring return means.

34. In combination, a heater including a frame, racks on opposite sides thereof each adapted to swing in an upright position, and a plurality of depressible push button operated mechanisms adjacent the base of said frame and each having rack swinging mechanism operatively connected to one of said racks.

35. In combination, a heater including a frame and a movable rack thereon adapted to swing in an upright position, and swinging mechanism therefor including operative connections movable horizontally below the rack and actuating means for said connections movable longitudinally of the frame.

36. In combination, a heater including a frame and a movable rack thereon adapted to swing in an upright position, and swinging mechanism therefor including actuating means and a longitudinally reciprocating member movable longitudinally of the frame.

37. In combination, a heater including a frame and a movable rack thereon adapted to swing in an upright position, and swinging mechanism therefor including a longitudinally reciprocating member movable longitudinally of the frame and a longitudinally movable actuating lever for said member.

38. In combination, a heater including a frame and a movable rack thereon adapted to swing in an upright position, and swinging mechanism therefor including a longitudinally reciprocating member movable longitudinally of the frame and a longitudinally movable actuating lever for said member, said longitudinally reciprocating member being disposed below said rack and said actuating lever extending upward at one end of the frame.

39. Toaster rack swinging mechanism including a reciprocable member, a swinging member operatively connected to the rack and movable independently of said reciprocable member and engaged and swung thereby when the latter is reciprocated in one direction, and spring means for swinging said swinging member tensioned by said reciprocable member and automatically operative after a predetermined reciprocation thereof.

40. Toaster rack swinging mechanism including a reciprocable member, a swinging member operatively connected to the rack and movable independently of said reciprocable member and engaged and swung thereby when the latter is reciprocated in one direction, and spring means acting on each of said members and tensioned by said reciprocating member when the latter is reciprocated in one direction.

41. A toaster having racks on each side thereof, swinging mechanism for said racks including a plurality of spring connected projecting swinging members each movable with a different rack, and actuating means for said members including spring connected reciprocable means engageable therewith to swing the same when reciprocated in one direction and so connected thereto as thereupon to permit further swinging of said projecting members by their spring connections.

42. A toaster having racks on each side thereof, swinging mechanism for said racks including a plurality of spring connected projecting swinging members each movable with a different rack, and actuating means for said members including a plurality of independently operable spring connected reciprocable members each engageable with one swinging member to swing the same and tension the spring thereof when said reciprocable member is reciprocated in one direction.

43. In a toaster, a frame having a toast rack at each side thereof, means whereby each rack may be reversed relative to the frame, and supplementary reversing mechanism including supplementary actuating means operative upon actuation of the latter to reverse the racks and so connected to said first mentioned reversing mechanism as to permit independent operation of the latter when desired.

44. In a toaster, a frame having a toast rack at each side thereof, means whereby each rack may be reversed relative to the frame, and supplementary reversing mechanism including a plurality of supplementary actuating means each operative upon a different rack and so connected to the first mentioned reversing mechanism as to permit independent operation of the latter when desired.

45. In a toaster, cooperating heater and toast rack means, one stationary and the other comprising a plurality of pivoted elements on opposite sides of said stationary means, a frame carrying all of said means and having a base beneath the pivots of said pivoted elements, and adjusting mechanism for said pivoted elements including members movable with different pivoted elements, operating mechanism for said members disposed in said base and including horizontally movable oppositely extending arms engaging said members and actuating the same, and actuating means for said arms engageable by an operator.

46. In a toaster, a frame, cooperating heater and toast rack means thereon, one stationary and one pivoted for adjustment relative to the other, and means for adjusting said pivoted element including a member swinging with said adjustable element, an actuating member engageable by an operator, and operative connections between said members disposed beneath said elements and having a cam member movable in a horizontal plane by said actuating member along said swinging member and swinging the same and said pivoted element.

47. In a toaster, cooperating heater and toast rack means, one stationary and the other comprising a plurality of pivoted elements on opposite sides of said stationary means, a frame carrying all of said means, and adjusting mechanism for said pivoted elements including members movable with different pivoted elements and operating mechanism for said members having actuating means engageable by an operator and movable longitudinally of said frame about pivot means perpendicular to the axes of said pivoted elements.

48. In a toaster, co-operating heater and toast rack means, one stationary and the other comprising a plurality of pivoted elements on opposite sides of said stationary means, mechanism including operating means movable about vertical pivot means for simultaneously swinging both of said pivoted elements relative to said stationary means, and a manually engageable member having operative connections for actuating said mechanism.

49. In a toaster, co-operating heater and toast rack means, one stationary and the other comprising a plurality of pivoted elements on opposite sides of said stationary means, mechanism for simultaneously swinging both of said pivoted elements relative to said stationary means, actuating means for said mechanism operative to effect swinging of said pivoted elements having a manually engageable member, and cam like means movable substantially longitudinally actuated by said manually engageable member and actuating said mechanism while said member is being manually operated.

50. In a toaster, co-operating heater and toast rack means, one stationary and the other comprising a plurality of pivoted elements on opposite sides of said stationary means, mechanism for simultaneously swinging both of said pivoted elements relative to said stationary means, actuating mechanism for said swinging mechanism operative to effect swinging of said pivoted elements having a manually engageable member, cam like means movable substantially horizontally actuated by said manually engageable member and actuating said swinging mechanism during movement of said member, and means for thereafter automatically actuating said swinging mechanism and resetting said member.

51. In a toaster, co-operating heater and toast rack means, one stationary and the other comprising a plurality of pivoted elements on opposite sides of said stationary means, mechanism including operating means movable about vertical pivot means for simultaneously swinging both of said pivoted elements relative to operative position with respect to said stationary means, a manually engageable member having operative connections for actuating said mechanism, and means for returning said pivoted elements and resetting said mechanism and actuating member.

52. In a toaster, a base, co-operating heater and toast rack means disposed above said base, one stationary and the other comprising a plurality of pivoted elements on opposite sides of said stationary means, and mechanism for swinging said pivoted elements relative to said stationary means having operating means in said base, connections actuated thereby and actuating said elements, and actuating means for said operating means operable from the exterior of said base.

53. In a toaster, a base, co-operating heater and toast rack means disposed above said base, one stationary and the other comprising a plurality of pivoted elements on opposite sides of said stationary means, and mechanism for swinging said pivoted elements relative to said stationary means having swinging links connected to said elements externally of said base, horizontally moving link swinging means in said base, and a manually engageable swinging member for actuating said link swinging means and operable from the exterior of said base.

54. In a toaster, a base, co-operating heater and toast rack means disposed above said base, one stationary and the other comprising a plurality of pivoted elements on opposite sides of said stationary means, and mechanism for swinging said pivoted elements relative to said stationary means having a single depressible push button operative from the exterior of said base, and operative connections in said base actuated by said push button and having externally extending connections operatively connected to said pivoted elements.

55. In a toaster, co-operating heater and toast rack means, one stationary and the other comprising a plurality of pivoted elements on opposite sides of said stationary means, mechanism for simultaneously swinging both of said pivoted elements relative to said stationary means including operating means movable about vertical pivot means, cam members, and cam operated members engageable therewith and movable thereby with said pivoted elements, and a manually engageable member having operative connections for actuating said cam members.

56. In a toaster, co-operating heater and toast rack means, one stationary and the other comprising a plurality of pivoted elements on opposite sides of said stationary means, pivoted members, vertically disposed pivot means for said members, means between such members and such elements for swinging said elements upon operation of said members, an actuating member movable in substantially horizontal planes, means actuated thereby for moving said pivoted members about said pivot means, and hand operated means for actuating said actuating member.

LOUIS V. LUCIA,

CERTIFICATE OF CORRECTION.

Patent No. 1,920,871.             August 1, 1933.

LOUIS V. LUCIA.

It is hereby certified that error appears in the printed specification of the above numbered patent requiring correction as follows: Page 5, lines 83 and 84, claim 49, for "longitudinally" read "horizontally"; and lines 108 and 109, claim 51, strike out the words "to operative position with respect"; and that the said Letters Patent should be read with these corrections there in that the same may conform to the record of the case in the Patent Office.

Signed and sealed this 24th day of October, A. D. 1933.

(Seal)                                            Acting Commissioner of Patents.

rack means, one stationary and the other comprising a plurality of pivoted elements on opposite sides of said stationary means, mechanism for simultaneously swinging both of said pivoted elements relative to said stationary means including operating means movable about vertical pivot means, cam members, and cam operated members engageable therewith and movable thereby with said pivoted elements, and a manually engageable member having operative connections for actuating said cam members.

56. In a toaster, co-operating heater and toast rack means, one stationary and the other comprising a plurality of pivoted elements on opposite sides of said stationary means, pivoted members, vertically disposed pivot means for said members, means between such members and such elements for swinging said elements upon operation of said members, an actuating member movable in substantially horizontal planes, means actuated thereby for moving said pivoted members about said pivot means, and hand operated means for actuating said actuating member.

LOUIS V. LUCIA,

CERTIFICATE OF CORRECTION.

Patent No. 1,920,871.            August 1, 1933.

LOUIS V. LUCIA.

It is hereby certified that error appears in the printed specification of the above numbered patent requiring correction as follows: Page 5, lines 83 and 84, claim 49, for "longitudinally" read "horizontally"; and lines 108 and 109, claim 51, strike out the words "to operative position with respect"; and that the said Letters Patent should be read with these corrections there in that the same may conform to the record of the case in the Patent Office.

Signed and sealed this 24th day of October, A. D. 1933.

(Seal)                                           Acting Commissioner of Patents.

CERTIFICATE OF CORRECTION.

Patent No. 1,920,871.  August 1, 1933.

LOUIS V. LUCIA.

It is hereby certified that error appears in the printed specification of the above numbered patent requiring correction as follows: Page 5, lines 83 and 84, claim 49, for "longitudinally" read "horizontally"; and lines 108 and 109, claim 51, strike out the words "to operative position with respect"; and that the said Letters Patent should be read with these corrections there in that the same may conform to the record of the case in the Patent Office.

Signed and sealed this 24th day of October, A. D. 1933.

(Seal)  Acting Commissioner of Patents.